(12) United States Patent
Castellano

(10) Patent No.: US 11,809,741 B2
(45) Date of Patent: Nov. 7, 2023

(54) CONTROLLER CIRCUIT, CORRESPONDING SYSTEM AND METHOD

(71) Applicant: STMICROELECTRONICS S.r.l., Agrate Brianza (IT)

(72) Inventor: Gerardo Castellano, Cusago (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 17/737,600

(22) Filed: May 5, 2022

(65) Prior Publication Data

US 2022/0365711 A1 Nov. 17, 2022

(30) Foreign Application Priority Data

May 13, 2021 (IT) .................. 102021000012395

(51) Int. Cl.
*G06F 3/06* (2006.01)
(52) U.S. Cl.
CPC .......... *G06F 3/0656* (2013.01); *G06F 3/0619* (2013.01); *G06F 3/0673* (2013.01)
(58) Field of Classification Search
CPC .... G06F 3/0656; G06F 3/0619; G06F 3/0673; B06R 21/013; B06R 21/26; B06R 21/264; H04L 43/022; H04L 67/12; H04L 69/12
See application file for complete search history.

(56) References Cited

U.S. PATENT DOCUMENTS

| | | | |
|---|---|---|---|
| 5,864,505 A | 1/1999 | Higuchi | |
| 5,965,819 A * | 10/1999 | Piety | G01H 1/003 702/56 |
| 2004/0249545 A1 * | 12/2004 | Lu | B60T 8/172 701/70 |
| 2011/0225465 A1 | 9/2011 | Blackmon et al. | |
| 2012/0166039 A1 | 6/2012 | Kitagawa et al. | |
| 2015/0229180 A1 * | 8/2015 | Friedman | H02K 11/215 310/90 |
| 2018/0068495 A1 * | 3/2018 | Chainer | G07C 5/008 |
| 2019/0318555 A1 * | 10/2019 | Hansel | G11C 16/10 |
| 2019/0332390 A1 * | 10/2019 | Kaminski | G05D 1/0088 |
| 2020/0042191 A1 | 2/2020 | Shulman et al. | |
| 2020/0174897 A1 * | 6/2020 | McNamara | G06F 9/5027 |
| 2021/0156715 A1 * | 5/2021 | Stauss | G01N 33/46 |
| 2022/0044043 A1 * | 2/2022 | Zhu | G06N 3/063 |
| 2022/0210305 A1 * | 6/2022 | Feng | H04N 23/62 |
| 2022/0377357 A1 * | 11/2022 | Meng | G06T 9/00 |
| 2022/0382694 A1 * | 12/2022 | Jun | G06F 13/24 |

* cited by examiner

*Primary Examiner* — Hiep T Nguyen
(74) *Attorney, Agent, or Firm* — SEED INTELLECTUAL PROPERTY LAW GROUP LLP

(57) ABSTRACT

A device includes signal processing circuits, a RAM, and RAM management circuitry. The signal processing circuits produce output data signals as a function of current and past values of sensor data signals. The RAM is organized into a set of RAM sections storing sensor data signal values. The RAM management circuitry has a buffer accessible by the plurality of signal processing circuits, and manages storage and retrieval of data in the RAM sections independently of one another by executing sets of memory operations. A set of memory operations includes a read operation, during which past values of sensor data signals are read from a section of the RAM and stored in the buffer, and a write operation, during which current values of sensor data signals are written into the section of the RAM read during the read operation.

21 Claims, 4 Drawing Sheets

CONTROLLER CIRCUIT, CORRESPONDING SYSTEM AND METHOD

BACKGROUND

Technical Field

The description relates to controller circuits.

One or more embodiments can be applied—advantageously, yet not exclusively—in airbag systems in the automotive field.

Description of the Related Art

A high degree of configurability and parallelism is a desirable feature in airbag systems.

To that effect, processing architectures are oftentimes resorted which comprise a plurality of substantially identical, fully-configurable blocks currently referred to as "safing engines."

These blocks are used in integrated circuits (ICs) to process external sensor data.

The individual safing engines can be configured to implement various types of procedures (algorithms) in order to reduce signal noise. These procedures may comprise, for instance, a counter procedure (counting the number of times a digital signal changes state) and/or a moving average algorithm which facilitate achieving good reliability and low-complexity.

Digital area optimization and IC cost are factors which may become critical in various applications. For instance, the overall memory involved in implementing a moving average for all sensor data can introduce a significant overhead in terms of digital IC area, primarily if implemented using standard volatile memories based on flip-flops.

BRIEF SUMMARY

One or more embodiments may relate to a corresponding system.

An airbag control system for use in the automotive sector may be exemplary of such a system.

One or more embodiments may relate to a corresponding method.

In one or more embodiments, a RAM-based implementation provides, especially for large memory sizes, significant savings in terms of logical area with respect to flip-flop implementations.

In one or more embodiments, the risk of rendering management more complex and likely to give rise to side effects may be effectively countered, so that undesired logic area overhead and processing latency may be avoided.

In an embodiment, a device comprises a plurality of signal processing circuits, which, in operation, perform parallel processing of input sensor data signals and produce output data signals as a function of current and past values of said sensor data signals, a random access memory (RAM), which, in operation, stores values of the sensor data signals, the RAM having a set of RAM sections, and RAM management circuitry having a buffer accessible by the plurality of signal processing circuits, and control circuitry, wherein the control circuitry, in operation, manages storage and retrieval of data in sections of the RAM, the managing comprising executing sets of memory operations, a set of memory operations including: a read operation during which past values of sensor data signals are read from a section of the RAM and stored in the buffer; and a write operation during which current values of sensor data signals are written into the section of the RAM read during the read operation, overwriting the past values of sensor data signals stored in the section of the RAM.

In an embodiment, a system comprises a sensor, which, in operation, produces input sensor data signals; a plurality of a plurality of signal processing circuits coupled to the sensor, wherein the plurality of signal processing circuits, in operation, perform parallel processing of sensor data signals and produce output data signals as a function of current and past values of said sensor data signals; a random access memory (RAM), which, in operation, stores values of the sensor data signals, the RAM having a set of RAM sections; and RAM management circuitry having a buffer accessible by the plurality of signal processing circuits, and control circuitry, wherein the control circuitry, in operation, manages storage and retrieval of data in the RAM sections of the RAM, the managing comprising executing sets of memory operations, a set of memory operations including: a read operation during which past values of sensor data signals are read from a section of the RAM and stored in the buffer; and a write operation during which current values of sensor data signals are written into the section of the RAM read during the read operation, overwriting the past values of sensor data signals stored in the section of the RAM.

In an embodiment, a method comprises: receiving sensor data; generating, using a plurality of signal processing circuits operating in parallel, output data as a function of current and past sensor data values; and managing storage and retrieval of received sensor data values in a random access memory (RAM) organized into sections, the managing comprising executing sets of memory operations, a set of memory operations including: a read operation during which past values of sensor data signals are read from a section of the RAM and stored in a buffer accessible by the plurality of signal processing circuits; and a write operation during which current values of sensor data signals are written into the section of the RAM read during the read operation, overwriting the past values of sensor data signals stored in the section of the RAM.

In an embodiment, a non-transitory computer-readable medium's contents cause a processing device to perform a method, the method comprising: receiving sensor data; generating, using a plurality of signal processing circuits operating in parallel, output data as a function of current and past sensor data values; and managing storage and retrieval of received sensor data values in a random access memory (RAM) organized into sections, the managing comprising executing sets of memory operations, a set of memory operations including: a read operation during which past values of sensor data signals are read from a section of the RAM and stored in a buffer accessible by the plurality of signal processing circuits; and a write operation during which current values of sensor data signals are written into the section of the RAM read during the read operation, overwriting the past values of sensor data signals stored in the section of the RAM.

BRIEF DESCRIPTION OF THE SEVERAL VIEWS OF THE DRAWINGS

One or more embodiments will now be described, by way of example only with reference to the annexed figures, wherein.

DETAILED DESCRIPTION

In the ensuing description one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The headings/references used herein are provided merely for convenience and hence do not define the extent of protection or the scope of the embodiments.

Airbag systems are nowadays a widespread, safety-relevant application in the automotive sectors.

Figure 1:
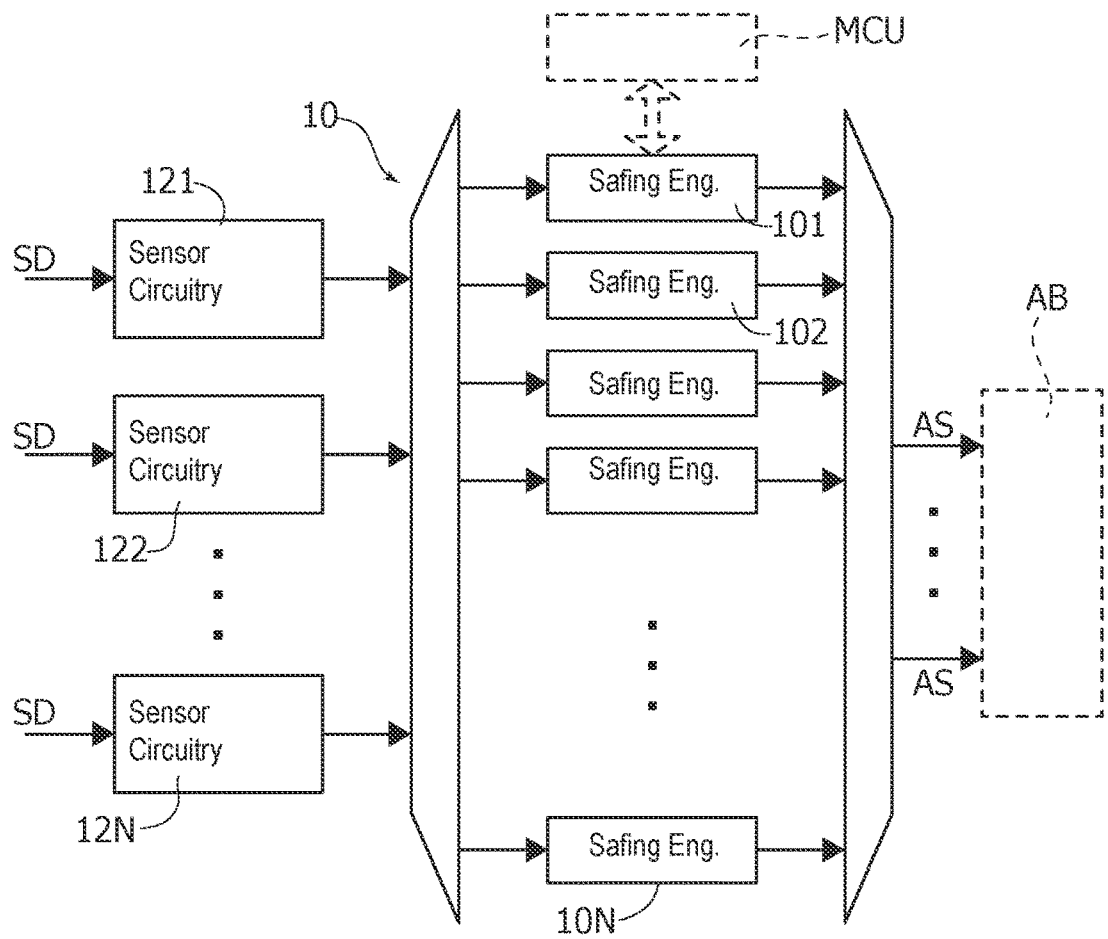
FIG. 1 is a block diagram of a controller circuit which can be used, for instance, in an airbag system.

As schematically represented in FIG. 1, an airbag system may comprise a "pyrotechnic" section (designated AB in FIG. 1) which include one or more airbags configured to be mounted in the passenger compartment of a vehicle (not visible in the figures) and fired to cause the airbags to inflate in the case of a rapid deceleration which may be indicative of a collision experienced by the vehicle.

The system also includes control circuitry comprising a main control unit (such as a microcontroller unit, designated MCU) and a set of circuits such as integrated circuits (101, 102, . . . 10N, collectively designated 10) configured to digitally process in parallel (external) sensor data SD received via different sensor data acquisition circuits 121, 122, . . . , 12N.

This arrangement is intended to give rise to redundant processing so that the sensor data SD are processed in parallel (essentially via identical processing procedures or algorithms).

The results of such processing (arming status signals designated AS in FIG. 1) are used to control airbag operation as desired, that is, airbag deployment in the case of a rapid deceleration (a collision, for instance) experienced by the vehicle, avoiding, on the one hand, non-required airbag deployment and, on the other hand, failed airbag deployment when required.

It will be otherwise appreciated that an airbag control system is just an example of one of a variety of possible fields of applications of embodiments.

It will be likewise appreciated that the embodiments discussed herein are primarily involved with circuit architecture underlying operation of the safing circuits ("safing engines") 101, 102, . . . 10N, designated as a whole 10 in FIG. 1 rather than on the criteria underlying:

reception of the sensor data signal SD via the sensor data acquisition circuitry (blocks 121, 122, . . . , 12N in FIG. 1), which may perform—in a manner know per se to those of skill in the art—actions such as (pre)filtering, analog-to-digital conversion (ADC) and other forms of conditioning of the sensor data SD, and/or operation of the controlled system (here, an airbag system AB) as coordinated—again, in a manner known per se to those of skill in the art—by the control unit designated MCU.

Reference to controlling an airbag system is thus merely exemplary—and non limiting—of possible fields of application of the embodiments.

Embodiments as discussed herein can be applied, in general, to contexts where input signals such as sensor signals SD are processed, with a view to possibly triggering one or more actuators (such as the "pyrotechnic" section of an airbag system) according to a redundancy scheme, wherein similar (virtually identical) processing procedures are applied to a same input signal.

Briefly, embodiments as discussed herein concern circuits which, as is the case of the circuit 10 herein comprise a set of processing units 101, 102, . . . , 10N configured to perform parallel processing of input sensor data signals (SD, as pre-processed in the sensor date acquisition blocks 121, 122, . . . , 12N) and produce output data signals such as a function of current and past values of the sensor data signals SD.

The input data (signals) have current values x(n) and past values x(n−K), . . . , x(n−(K−1), X(n−1) and (digital) processing in the units or engines 101, 102, . . . , 10N produces output data signals y(n) which are a function of both the current and the past values of the input data.

In order to make a system as exemplified in FIG. 1 (an airbag system being just exemplary of such a system) as versatile as possible, high configurability and parallelism are desired wherein fully configurable blocks such as the safing engines 101, 102, . . . , 10N are used to process sensor data SD in a control circuit 10 suited to the implemented as an integrated circuit.

For instance, the various safing engines 101, 102, . . . , 10N may be configured (in a manner known per se to those of skill in the art) to implement different procedures intended, for instance, to reduce the noise affecting the "useful" sensor signal.

An event counter or a moving average are exemplary of such procedures which facilitate achieving reliability with low complexity as desired.

Digital area optimization and a reduced overhead (and thus cost) in the resulting circuit (an integrated circuit, for instance) are thus factors to take into account.

Referring, by way of example, to moving average processing of the sensor data SD, a moving average transfer function over a sample window length K can be defined (this can be regarded essentially as a standard definition) as $$y(n)=(1/K)\Sigma x(n-i)$$

with the summation $\Sigma$ being for i=0, . . . , K−1.

The implementation complexity can be reduced from K to 2—passing from (K−1) to two sums (additions) for each sample)—with a simplified formula $$y(n)=(1/K)\cdot S(n)=(1/K)\cdot((x(n)+Ky(n-1)-x(n-K))= (1/K)((x(n)+S(n-1)-x(n-K),$$

where S(n) and S(n−1) designate the current value of the summation at a n-th (sample) time and S(n−1) is the previous value of the summation at a (n−1)th (sample) time It is otherwise noted that the memory space involved in such processing does not change in so far as the overall memory involved in keeping all sensor data having a bit length L for N safing engines 101, 102, . . . , 10N can be expressed as MeM [bits]=N.K.L.

A known way of implementing a digital volatile memory in a custom integrated circuit (IC) is based on flip-flops (FFs). However, this approach can introduce a significant overhead in terms of digital IC area.

Figure 2:
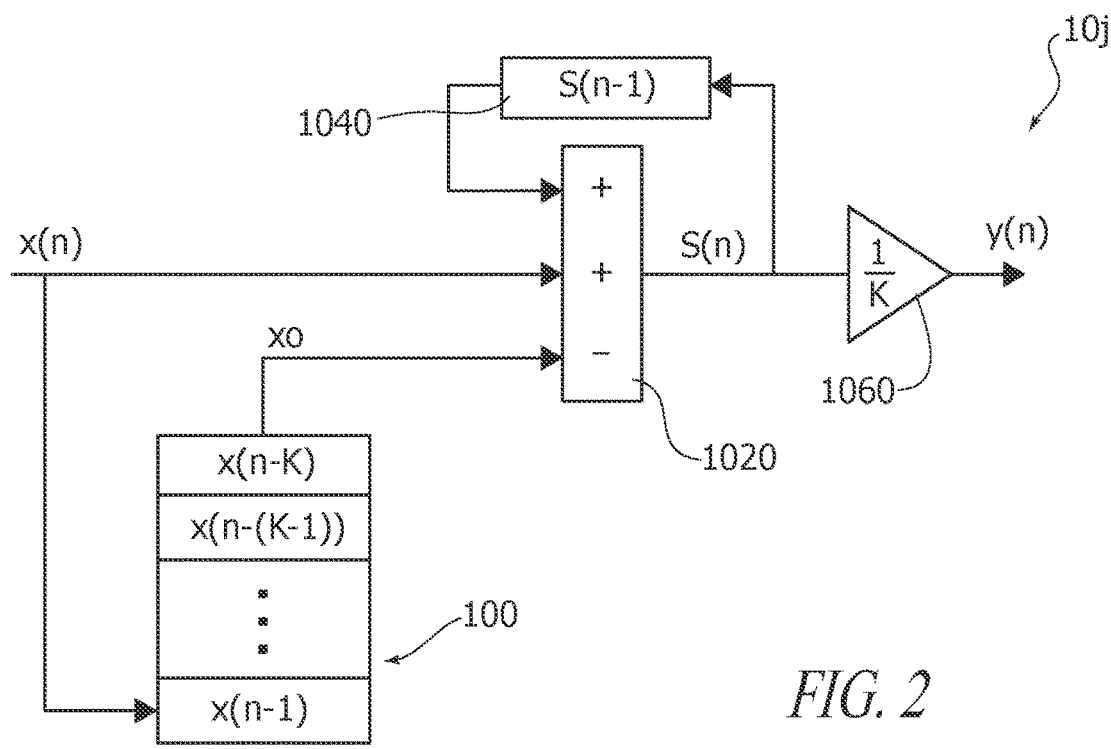
FIG. 2 is a circuit diagram exemplary of principles underlying embodiments of the present description.

As illustrated in FIG. 2, one or more embodiments may reduce the overhead of digital area due to the memory involved in storing sensor data by replacing a whole dedicated FF-based memory for each safing engine 101, 102, . . . , 10N with a concentrated random-access memory or RAM.

Such an approach is exemplified in the circuit diagram of FIG. 2.

This diagram can be regarded as exemplary of a possible architecture of any of the safing engines 101, 102, . . . , 10N as exemplified by 10j (j=1, 2, . . . , N).

Architecture as exemplified in FIG. 2 can be configured to implement the relationship discussed in the foregoing (namely y(n)=(1/K)·(x(n)+S(n−1)−x(n−K))). In such architecture, the "past" values of the data from the sensor data acquisition modules 121, 122, . . . , 12N— namely x(n−1), x(n−(K−1), x(n−K)—can be stored in a sensor data memory (a random-access memory or RAM, designated 100 in FIG. 2) to be supplied (with a negative sign in the exemplary case considered herein) to an adder block 1020.

The adder block also receives (with a positive sign in the exemplary case considered herein) the current sample x(n) from the sensor data acquisition circuitry (121, 122, . . . , 12N) and the value S(n−1), that is the previous value of the sum accumulated at the output of the adder 1020 (represented in FIG. 2 as re-circulated via a register 1040).

The output from the adder 1020—namely S(n)—is applied to a gain block 1060 (in practice a multiplier with a gain factor 1/K or, seen otherwise, a divider with a dividing factor equal to K) to produce the current output value y(n).

One or more embodiments thus facilitate passing from N flip-flop memory blocks, each dedicated to one safing engine, to a single RAM memory block, shared by all the safing engines.

Figure 3:
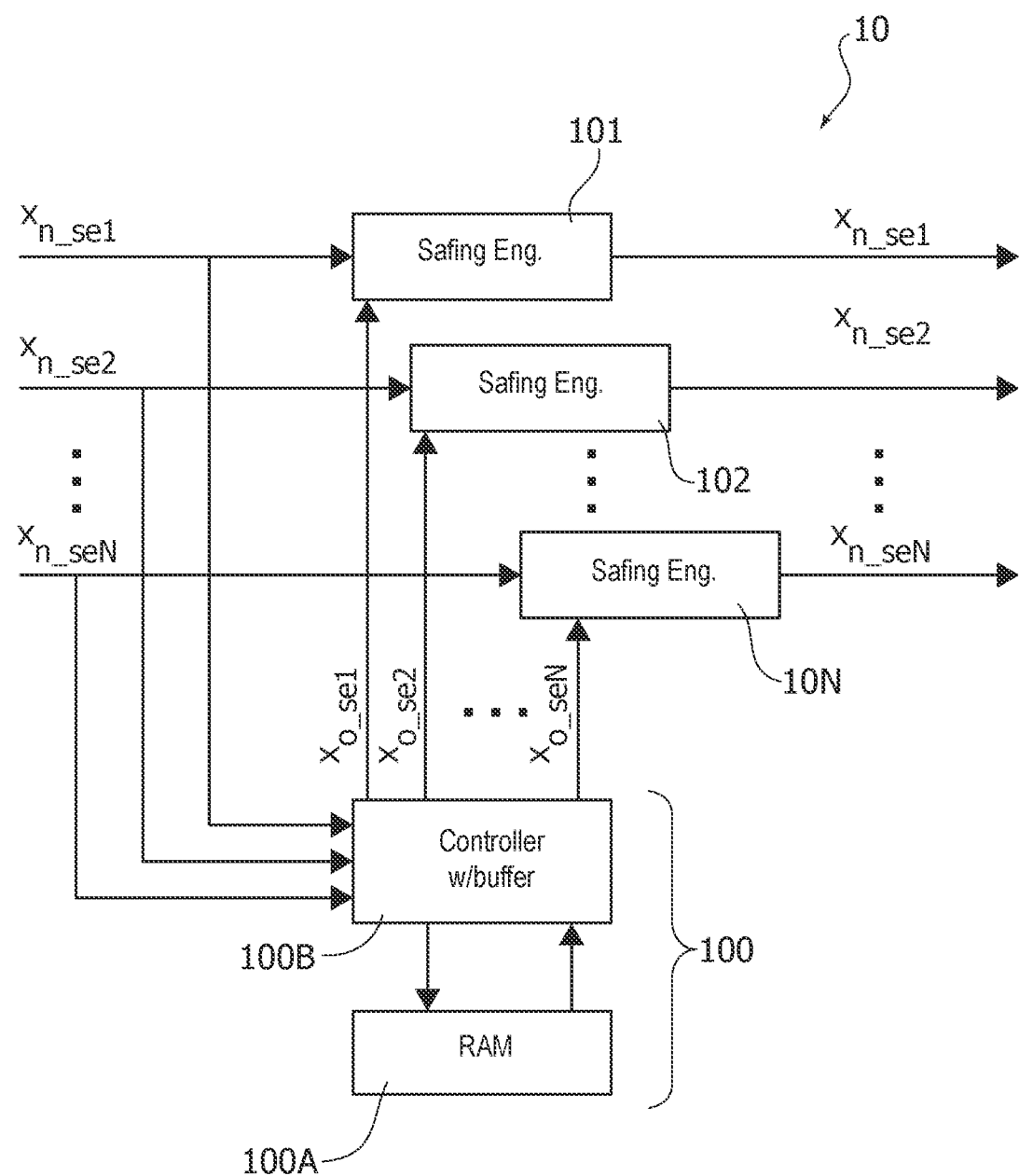
FIGS. 3 and 4 are exemplary of possible embodiments of elements illustrated in FIG. 2.

The diagram of FIG. 3 is exemplary of a possible practical implementation of the concept outlined in FIG. 2 (that is, using a RAM in the place of equivalent flip-flop registers) which facilitates achieving a lower digital area occupation as the memory size increases.

In FIG. 3, references 101, 102, . . . , 10N again indicate safing engines configured to implement—by way of example—a moving average relationship as discussed in the foregoing.

As noted, the embodiments are not limited to such a specific procedure/algorithm: the same criteria discussed herein can apply to other procedures/algorithms such as, just to make one possible example, an event counter (counting the number of times a digital signal changes state).

Figure 4:
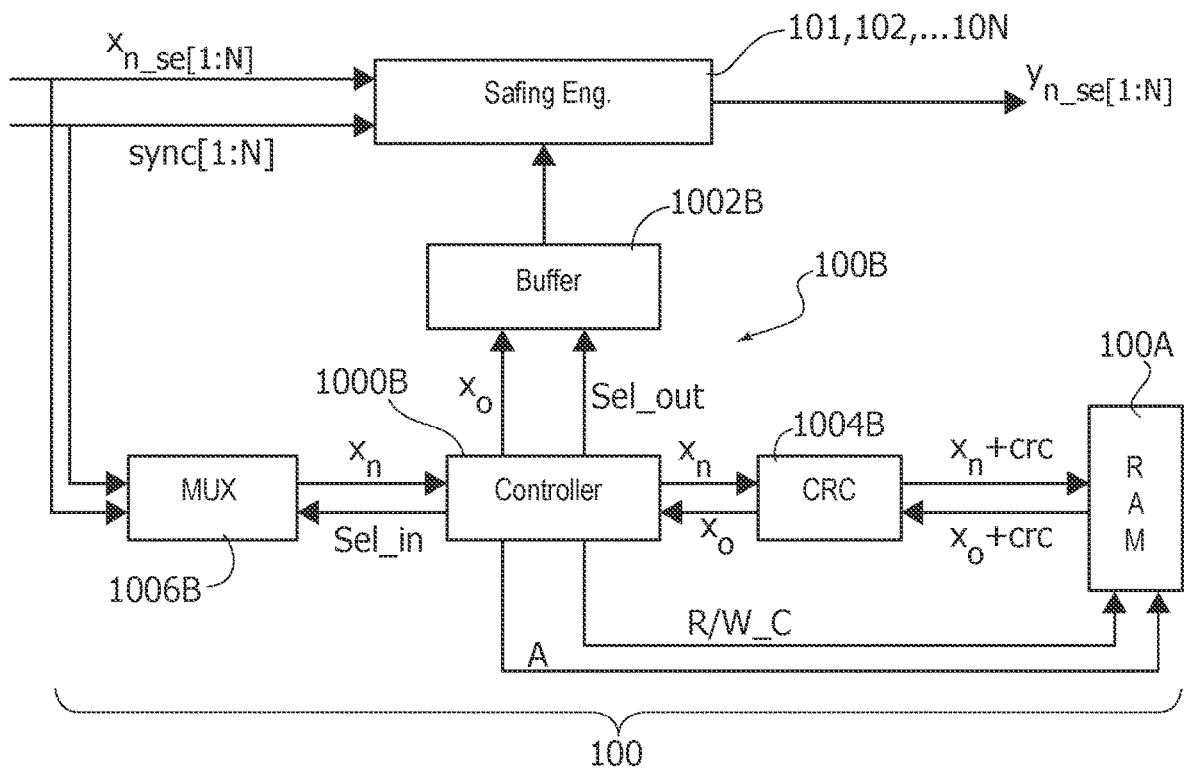

The safing engines 101, 102, . . . , 10N in FIG. 3 can be regarded as including blocks such as blocks 1020, 1040 and 1060 in FIG. 2 configured to operate on respective input data sets $x_{n\_se1}$, $x_{n\_se2}$, . . . , $x_{n\_seN}$ (that is, $x_{n\_se[1:N]}$ in FIG. 4) to produce corresponding output data sets $y_{n\_se1}$, $y_{n\_se2}$, . . . , $y_{n\_seN}$ (that is, $y_{n\_se[1:N]}$ in FIG. 4).

As illustrated in FIGS. 3 and 4, processing in the safing engines 101, 102, . . . , 10N is based on data sets $x_{o\_se1}$, $x_{o\_se2}$, . . . , $x_{o\_seN}$ which include past ("old") data retrieved from memory circuitry 100 including a plurality of RAM memory sections (a RAM memory block proper, shared by all safing engines) 100A having associated a RAM controller (with buffer) 100B.

One or more embodiments were found to benefit advantageously from a RAM controller 100B configured to manage write/read access with respect to the RAM memory area (sections) 100A without introducing undesired processing latency.

As exemplified in FIG. 4, the RAM controller designated 100B in FIG. 3 may be configured to include a main controller 1000B with an associated buffer 1002B which controls delivery to the various safing engines 101, 102, . . . , 10N of the respective values for $x_o$, namely $x_{o\_se[1:N]}$ which include values stored and retrieved from the RAM memory area 100A. Advantageously this may occur via a cyclical redundancy check (CRC) circuit 1004B.

As exemplified in FIG. 4, the input sensor data $x_{n\_se[1:N]}$ are received via an input data multiplexer 1600B with the main controller 1000B sending to the RAM memory area 100A read/write control signals R/W_C as well as address signals A.

Operation of an arrangement as exemplified in FIG. 4 may be controlled by a synchronization signal $Sync_{[1:N]}$ (as possibly generated by the "general" controller MCU of FIG. 1 or in any manner known to those of skill in the art for that purpose).

For instance, the synchronization signal may be related to the source of the sensor data and may switch any time a new data item comes in. It can thus be construed as a dedicated clock for each safing engine.

As illustrated in FIG. 4, the RAM controller 100B is configured to perform, in parallel for all safing engines 101, 102, . . . , 10N the following functions:

independent management of dedicated RAM sections in the RAM memory area 100A for each safing engine, storing in the RAM area 100A (all) received sensor data, reading from the RAM area 100A "past" (or "old") sensor data as a function of (each) moving average sample window length (or other parameters involved in processing as performed in the safing engines 101, 102, . . . , 10N), small FF-based buffer management to reduce a (and virtually avoid) processing latency, CRC computing and checking for sensor data integrity of the data stored in the RAM area 100A, and global RAM initialization and individual session cleaning in case of setting individual safing engines 101, 102, . . . , 10N.

Figure 5:
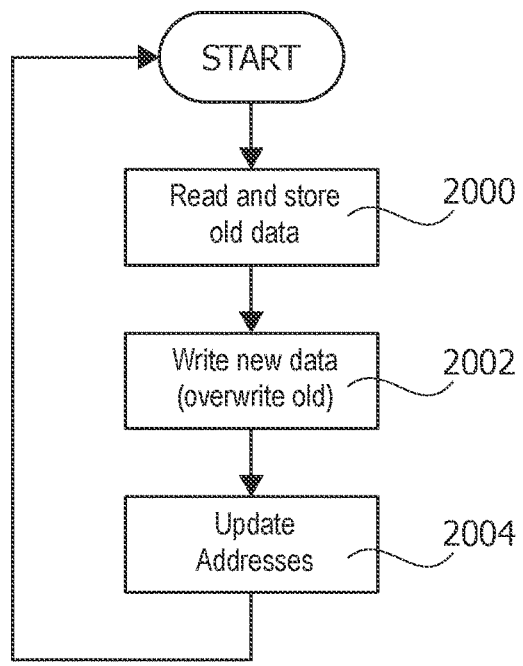
FIG. 5 is a flow-chart exemplary of possible operation of a control circuit according to embodiments of the present description.

In architecture as illustrated herein, each safing engine 101, 102, . . . , 10N can operate independently synchronized by a dedicated synchronism signal $Sync_{[1:N]}$, with the main controller 1000B configured to operate as exemplified in the flowchart of FIG. 5:

reading old data from the RAM area 100A and storing such data in the buffer 1002B; these actions, as exemplified by the block 2000 in FIG. 5, facilitate reducing (and virtually avoiding) latency for subsequent processing, primarily if a new request occurs during read/write operations;

writing in the RAM area 100A new data overwriting the old data previously loaded in the buffer 1200B, as exemplified by block 2002 in FIG. 5, and updating the address for subsequent (next) RAM access, as exemplified by block 2004 in FIG. 5.

That is, a circuit 10 as exemplified herein comprises random access memory, RAM circuitry such as 100 which is configured, instance via the controller 1006B, to store the sensor data signals.

Such a RAM circuitry comprises a set of random-access memory or RAM sections (100A) and RAM management circuitry (as represented by the block 100B in FIG. 3) comprising a buffer circuit 1002B as well as a controller circuit 1000B configured to manage the RAM sections in the set of RAM sections 100A independently of one another via sequences of:

a reading step (as represented by the block 2000 in FIG. 5), during which past values of the sensor data signals SD read from the RAM sections 100A are stored in the buffer circuit 1002B and made available to a respective processing unit 101, 102, . . . , 10N, and a writing step (as represented by the block 2002 in FIG. 5), during which current values of the sensor data signals SD are written into the RAM sections 100A overwriting therein the past values of sensor data signals SD stored in the buffer circuit 1002B during the reading step.

Advantageously, the controller circuit 1000B may be configured to produce address signals A for access to the RAM sections 100A, with the capability of produce (as represented by the block 2004 in FIG. 5) updated address signals A for access the RAM sections 100A in response to the writing step (as represented by the block 2002 in FIG. 5).

Advantageously, the RAM management circuitry 100B may comprises cyclical redundancy code, CRC computation and check circuitry 1004B coupled to the set of RAM memory sections 100A.

The CRC computation and check circuitry 1004B can be configured to produce CRC codes for the sensor data signals written into the set of RAM memory sections 100A. These CRC codes are coupled and stored together with respective sensor data signals written into the RAM sections 100A.

The CRC computation and check circuitry 1004B can be configured to perform CRC processing of the sensor data signals read from the RAM sections 100A.

The presence of the CRC computation and checking circuit block 1004B facilitates computing, for each data item intended to be stored in the memory 100A, a cyclic redundancy check (CRC) which is stored together with the data in the RAM area 100A to be checked when the data is red from the RAM memory area (RAM sections 100A).

This facilitates preserving data integrity during read/write processes while also countering undesired bit flipping in the RAM sections 100A.

As noted, the processing units 101, 102, . . . , 10N can be advantageously configured to receive a common synchronization signal $sync_{[1:N]}$ and perform mutually independent parallel processing of the input sensor data signals SD (possibly as pre-processed in the data acquisition blocks 121, 122, . . . , 12N) synchronized by the common synchronization signal $sync_{[1:N]}$. To that effect, the RAM management circuitry designated 100B can comprise an input data multiplexer 1006B controlled by the common synchronization signal $sync_{[1:N]}$ and configured to receive input sensor data signal and steer the individual input sensor data signals within the RAM management circuitry (that is 1000B, 1002B, 1004B, 100A: see FIG. 4) for having the sequence of a reading step (block 2000 in FIG. 5) and a writing step (block 2002 in FIG. 5) applied thereto individually.

Advantageously, the RAM management circuitry 100B is configured to perform:

concurrent initialization of—all—the RAM sections 100A, and/or selective cleaning of—individual—RAM sections 100A.

It is noted that, while represented herein as a separate entity for ease of explanation and understanding, the controller circuit block designated 1000B in FIG. 4 can in fact be incorporated in the "main" control unit designated MCU in FIG. 1.

In one or more embodiments, the controller MCU may otherwise be a distinct element from the embodiments.

This also generally applies to the controlled circuitry here designated AB: as noted, while reference to controlling airbag systems has been referred throughout the description by way of example, one or more embodiments are not limited to that possible use.

A system as discussed herein generally comprises at least one sensor SD configured (for instance via connection to sensor data acquisition blocks such as 121, 122, . . . , 12N) to produce input sensor data signals which are applied to a circuit 10 as discussed previously including a set of processing units 101, 102, . . . , 10N configured to perform parallel (digital) processing of the input sensor data signals and produce output data signals such as y(n) as a function of current and past values of the sensor data signals SD.

A system as discussed herein (see FIG. 1, for instance) comprises actuator circuitry (see, again in FIG. 1, the block AB coupled to the circuit 10 to receive therefrom the arming status signals AS derived from the signals y(n) configured to be actuated as a function of the output data signals y(n) produced by the processing units 101, 102, . . . , 10N.

For instance, the sensor S may be an automotive kinematic detector configured to produce input sensor data signals DS as a function of vehicle motion, and the actuator circuitry AS may comprises airbag firing circuitry AB configured to produce airbag deployment in response to the fact that the output data signals y(n) produced by the processing units 101, 102, . . . , 10N is indicative of a variation in vehicle speed (which may require airbag actuation).

Figure 6:
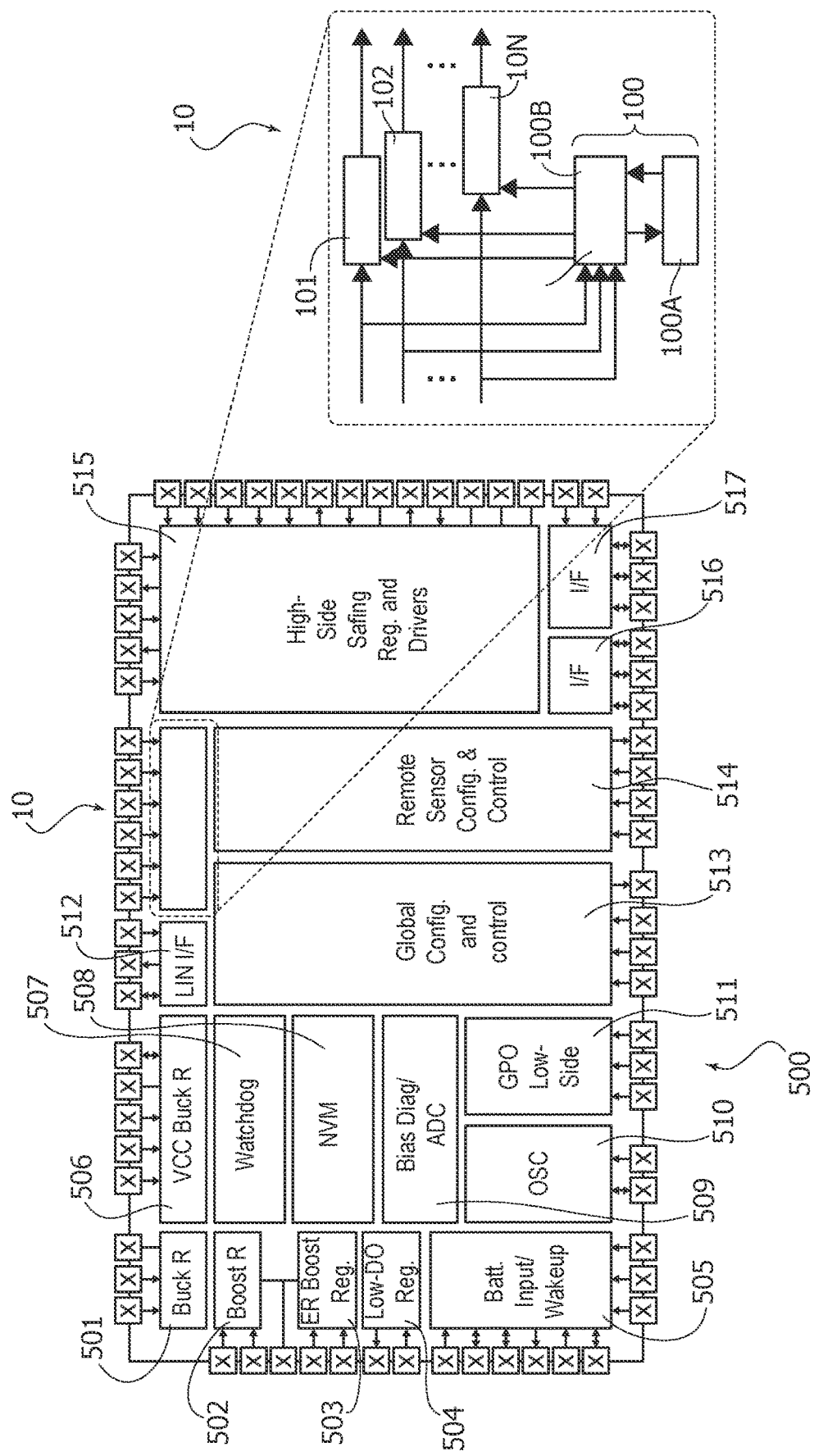
FIG. 6 is a block diagram exemplary of a system incorporating a control circuit according to embodiments of the present description.

The following designations apply to the circuit blocks visible in FIG. 6:

501 system buck regulator,
502 system boost regulator,
503 exchange ratio (ER) boost regulator,
504 low-dropout (V5) regulator,
505 battery input and wake up,
506 VCC (supply) buck regulator
507 watchdog,
508 non-volatile memory (NVM),
509 bias diagnostics and ADCs,
510 oscillators and monitoring,
511 general purpose output (GPO) low-side (LS) drivers,
512 local interconnect network (LIN) interface (I/F),
513 global configuration and control,
514 remote sensor configuration and control,
515 high-side (HS) safing FET regulators and deployment drivers (AB in FIG. 1); these may be power MOSFETs used for supplying the deployment drivers in airbag applications,
516 DC sensor I/F, and
517 remote sensor I/F.

Possible integration of a circuit 10 as discussed previously within the framework of an airbag control circuit designated as a whole 500 in FIG. 6 is however purely exemplary and not limiting of the embodiments.

A circuit 10 as discussed herein lends itself to being applied, in general to contexts of use where input sensor data signals such as SD are applied to the processing units 101, 102, . . . , 10N in the circuit 10, with the RAM management circuitry 100B activated to manage the RAM sections 100A independently of one another by performing the sequence of a reading step (2000 in FIG. 5) and a writing step (2002 in FIG. 5).

The processing units are thus enabled to perform parallel processing of input sensor data signals and produce output data signals y(n) as a function of current values, x(n), and past values, x(n−K), . . . , x(n−(K−1), X(n−1), of the sensor data signals SD.

A standard FF-based implementation of an arrangement as exemplified in FIG. 1 may involve a logic area occupation of about 0.884 mm$^2$.

By way of comparison, a RAM-based arrangement discussed herein (RAM area plus associated controller and built-in test feature—MBIST) may have a logic area occupation reduced to 0.320 mm$^2$ (when using 8.848 Kb BCD9SL technology as available with the applicant company).

It is noted that, for a large memory size, such a RAM-based implementation facilitates saving logical area with respect to flip-flop implementations.

A possible risk of rendering management more complex and likely to give rise to side effects can be effectively avoided by resorting to a particular implementation as exemplified in FIG. 4.

In that way architecture as discussed herein does not introduce a logic area overhead and processing latency.

Without prejudice to the underlying principles, the details and embodiments may vary, even significantly, with respect to what has been described by way of example only without departing from the extent of protection.

A circuit (10), may be summarized as including a set of processing units (101, 102, . . . , 10N) configured to perform parallel processing of input sensor data signals (SD; 121, 122, . . . , 12N) and produce output data signals (y(n)) as a function of current ((x(n)) and past (x(n−K), . . . , x(n−(K−1), X(n−1)) values of said sensor data signals (SD), random access memory, RAM circuitry (100) configured (1006B) to store said sensor data signals, the RAM circuitry (100) comprising a set of RAM sections (100A), RAM management circuitry (100B) comprising a buffer circuit (1002B) as well as a controller circuit (1000B) configured to manage the RAM sections in the set of RAM sections (100A) independently of one another via sequences of a reading step (2000), during which past values of said sensor data signals (SD) read from the RAM sections in the set of RAM sections (100A) are stored in said buffer circuit (1002B) and made available to said set of processing units (101, 102, . . . , 10N), and a writing step (2002), during which current values of said sensor data signals (SD) are written into the RAM sections in the set of RAM sections (100A) overwriting therein the past values of said sensor data signals (SD) stored in the buffer circuit (1002B) during the reading step (2000).

The controller circuit (1000B) may be configured to produce address signals (A) for access to the RAM sections in the set of RAM sections (100A), and produce (2004), in response to said writing step (2002), updated address signals (A) for access the RAM sections in the set of RAM sections (100A).

The RAM management circuitry (100B) may include cyclical redundancy code, CRC computation and check circuitry (1004B) coupled to the set of RAM memory sections (100A) and configured to produce CRC codes for the sensor data signals written into the set of RAM memory sections (100A), wherein the CRC codes are coupled and stored together with respective sensor data signals written into the set of RAM sections (100A), perform CRC processing of the sensor data signals read from the RAM sections in the set of RAM sections (100A).

The processing units (101, 102, . . . , 10N) in the set of processing units may be configured to receive a common synchronization signal (sync$_{[1:N]}$) and perform mutually independent parallel processing of the input sensor data signals (SD; 121, 122, . . . , 12N) synchronized by the common synchronization signal (sync$_{[1:N]}$), and the RAM management circuitry (100B) may include an input data multiplexer (1006B) controlled by said common synchronization signal (sync$_{[1:N]}$) and configured to received input sensor data signal (x$_{n\_se[1:N]}$) and to steer individual input sensor data signals in the received input sensor data signals (x$_{n\_se[1:N]}$) within the RAM management circuitry (1000B, 1002B, 1004B, 100A) for having said sequence of a reading step (2000) and a writing step (2002) individually applied thereto.

The RAM management circuitry (100B) may be configured to perform at least one of concurrent initialization of all the RAM sections (100A) in the RAM circuitry (100), and/or selective cleaning of individual RAM sections (100A) in the RAM circuitry (100).

Said parallel processing of input sensor data signals (SD; 121, 122, . . . , 12N) may include moving average processing input sensor data signals (SD; 121, 122, . . . , 12N) over a time window.

The circuit may be implemented as an integrated circuit.

A system may be summarized as including at least one sensor (SD) configured (121, 122, . . . , 12N) to produce input sensor data signals, a circuit (10) according to any of the previous claims, the circuit (10) including a set of processing units (101, 102, . . . , 10N) configured to perform parallel processing of said input sensor data signals (SD; 121, 122, . . . , 12N) and produce output data signals (y(n)) as a function of current and past values of said sensor data signals (SD), and actuator circuitry (AB) coupled (AS) to said circuit (10) and configured to be actuated as a function of the output data signals (y(n)) produced by said set of processing units (101, 102, . . . , 10N).

The at least one sensor (S) may include an automotive kinematic detector (S) configured to produce input sensor data signals (DS) as a function of vehicle motion, and the actuator circuitry (AS) coupled to said circuit (10) may include airbag firing circuitry (AB) configured to produce airbag deployment in response to said output data signals (y(n)) produced by said set of processing units (101, 102, . . . , 10N) being indicative of a variation in vehicle speed.

A method of operating a circuit (10) or a system may be summarized as including applying input sensor data signals (SD) to said set of processing units (101, 102, . . . , 10N) in the circuit (10), activating said RAM management circuitry (100B) to manage the RAM sections in the set of RAM sections (100A) independently of one another by performing said sequence of a reading step (2000) and a writing step (2002), wherein said processing units (101, 102, . . . , 10N) perform parallel processing of input sensor data signals (SD; 121, 122, . . . , 12N) and produce output data signals (y(n)) as a function of current (x(n)) and past (x(n−K), . . . , x(n−(K−1), X(n−1)) values of said sensor data signals (SD).

In an embodiment, a device comprises a plurality of signal processing circuits, which, in operation, perform parallel processing of input sensor data signals and produce output data signals as a function of current and past values of said sensor data signals, a random access memory (RAM), which, in operation, stores values of the sensor data signals, the RAM having a set of RAM sections, and RAM management circuitry having a buffer accessible by the plurality of signal processing circuits, and control circuitry, wherein the control circuitry, in operation, manages storage and retrieval of data in sections of the RAM, the managing comprising executing sets of memory operations, a set of memory operations including: a read operation during which past values of sensor data signals are read from a section of the RAM and stored in the buffer; and a write operation during which current values of sensor data signals are written into the section of the RAM read during the read operation, overwriting the past values of sensor data signals stored in the section of the RAM. In an embodiment, the control circuitry, in operation: generates address signals for access to RAM sections of the RAM; and in response to the write operation, updates address signals for access to the RAM sections of the RAM. In an embodiment, the RAM management circuitry comprises cyclical redundancy code (CRC) circuitry coupled to the RAM, wherein the CRC circuitry, in operation: generates CRC codes for the sensor data signals written into a RAM memory section during a write operation, wherein the generated CRC codes are stored together with respective sensor data signals written into the RAM section; performs CRC processing of the sensor data signals read from a RAM section during a read operation. In an embodiment, the signal processing circuits in the set of signal processing circuits, in operation, receive a common synchronization signal and perform mutually independent parallel processing of the input sensor data signals synchronized by the common synchronization signal, and the RAM management circuitry comprises an input data multiplexer controlled by said common synchronization signal and configured to receive input sensor data signals and to steer individual input sensor data signals in the received input sensor data signals within the RAM management circuitry. In an embodiment, the RAM management circuitry, in operation, performs: concurrent initialization of all the RAM sections in the RAM; or selective cleaning of individual RAM sections in the RAM. In an embodiment, said parallel processing of input sensor data signals comprises generating moving window average values of input sensor data signals. In an embodiment, the device comprises an integrated circuit including the plurality of signal processing circuits and the RAM management circuitry. In an embodiment, the integrated circuit includes the RAM.

In an embodiment, a system comprises a sensor, which, in operation, produces input sensor data signals; a plurality of a plurality of signal processing circuits coupled to the sensor, wherein the plurality of signal processing circuits, in operation, perform parallel processing of sensor data signals and produce output data signals as a function of current and past values of said sensor data signals; a random access memory (RAM), which, in operation, stores values of the sensor data signals, the RAM having a set of RAM sections; and RAM management circuitry having a buffer accessible by the plurality of signal processing circuits, and control circuitry, wherein the control circuitry, in operation, manages storage and retrieval of data in the RAM sections of the RAM, the managing comprising executing sets of memory operations, a set of memory operations including: a read operation during which past values of sensor data signals are read from a section of the RAM and stored in the buffer; and a write operation during which current values of sensor data signals are written into the section of the RAM read during the read operation, overwriting the past values of sensor data signals stored in the section of the RAM. In an embodiment, the system comprises: an actuator coupled to the plurality of signal processing circuits, wherein the actuator actuates based on the output data signals produced by the plurality of signal processing circuits. In an embodiment, the sensor comprises an automotive kinematic detector, which, in operation, produces sensor data signals as a function of vehicle motion, and the actuator comprises airbag firing circuitry, which, in operation, produces airbag deployment control signals in response to said output data signals produced by said plurality of signal processing circuits being indicative of an accident.

In an embodiment, a method comprises: receiving sensor data; generating, using a plurality of signal processing circuits operating in parallel, output data as a function of current and past sensor data values; and managing storage and retrieval of received sensor data values in a random access memory (RAM) organized into sections, the managing comprising executing sets of memory operations, a set of memory operations including: a read operation during which past values of sensor data signals are read from a section of the RAM and stored in a buffer accessible by the plurality of signal processing circuits; and a write operation during which current values of sensor data signals are written into the section of the RAM read during the read operation, overwriting the past values of sensor data signals stored in the section of the RAM. In an embodiment, the managing storage and retrieval of received sensor data includes: generating address signals to access sections of the RAM; and in response to a write operation of a set of memory operations, updating address signals to access sections of the RAM. In an embodiment, the managing storage and retrieval of received sensor data includes: generating CRC codes for the sensor data signals written into a RAM memory section during a write operation, wherein the generated CRC codes are stored together with respective sensor data signals written into the RAM section; performing CRC processing of the sensor data signals read from a RAM section during a read operation. In an embodiment, the method comprises synchronizing operation of the plurality of signal processing circuits using a common synchronization signal. In an embodiment, the method comprises concurrently initializing all the sections in the RAM. In an embodiment, the method comprises selectively initializing one or more individual sections of the RAM. In an embodiment, the generating the output data comprises generating moving window average values of input sensor data signals.

In an embodiment, a non-transitory computer-readable medium's contents cause a processing device to perform a method, the method comprising: receiving sensor data; generating, using a plurality of signal processing circuits operating in parallel, output data as a function of current and past sensor data values; and managing storage and retrieval of received sensor data values in a random access memory (RAM) organized into sections, the managing comprising executing sets of memory operations, a set of memory operations including: a read operation during which past values of sensor data signals are read from a section of the RAM and stored in a buffer accessible by the plurality of signal processing circuits; and a write operation during which current values of sensor data signals are written into the section of the RAM read during the read operation, overwriting the past values of sensor data signals stored in the section of the RAM. In an embodiment, the managing storage and retrieval of received sensor data includes: generating address signals to access sections of the RAM; and in response to a write operation of a set of memory operations, updating address signals to access sections of the RAM. In an embodiment, the contents comprise instructions executed by the processing device.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a plurality of signal processing circuits, which, in operation, perform parallel processing of input sensor data signals and produce output data signals as a function of current and past values of said sensor data signals;
a random access memory (RAM), which, in operation, stores values of the sensor data signals, the RAM having a set of RAM sections; and
RAM management circuitry having a buffer accessible by the plurality of signal processing circuits, and control circuitry, wherein the control circuitry, in operation, manages storage and retrieval of data in sections of the RAM, the managing comprising executing sets of memory operations, a set of memory operations including:
a read operation during which past values of sensor data signals are read from a section of the RAM and stored in the buffer; and
a write operation during which current values of sensor data signals are written into the section of the RAM read during the read operation, overwriting the past values of sensor data signals stored in the section of the RAM.

2. The device of claim 1, wherein the control circuitry, in operation:
generates address signals for access to RAM sections of the RAM; and
in response to the write operation, updates address signals for access to the RAM sections of the RAM.

3. The device of claim 1, wherein the RAM management circuitry comprises cyclical redundancy code (CRC) circuitry coupled to the RAM, wherein the CRC circuitry, in operation:
generates CRC codes for the sensor data signals written into a RAM memory section during a write operation, wherein the generated CRC codes are stored together with respective sensor data signals written into the RAM section; and
performs CRC processing of the sensor data signals read from a RAM section during a read operation.

4. The device of claim 1, wherein
the signal processing circuits in the set of signal processing circuits, in operation, receive a common synchronization signal and perform mutually independent parallel processing of the input sensor data signals synchronized by the common synchronization signal, and
the RAM management circuitry comprises an input data multiplexer controlled by said common synchronization signal and configured to receive input sensor data signals and to steer individual input sensor data signals in the received input sensor data signals within the RAM management circuitry.

5. The device of claim 1, wherein the RAM management circuitry, in operation, performs:
concurrent initialization of all the RAM sections in the RAM; or
selective cleaning of individual RAM sections in the RAM.

6. The device of claim 1, wherein said parallel processing of input sensor data signals comprises generating moving window average values of input sensor data signals.

7. The device of claim 1, comprising an integrated circuit including the plurality of signal processing circuits and the RAM management circuitry.

8. The circuit of claim 7, wherein the integrated circuit includes the RAM.

9. A system, comprising:
a sensor, which, in operation, produces input sensor data signals;
a plurality of a plurality of signal processing circuits coupled to the sensor, wherein the plurality of signal processing circuits, in operation, perform parallel processing of sensor data signals and produce output data signals as a function of current and past values of said sensor data signals;
a random access memory (RAM), which, in operation, stores values of the sensor data signals, the RAM having a set of RAM sections; and
RAM management circuitry having a buffer accessible by the plurality of signal processing circuits, and control circuitry, wherein the control circuitry, in operation, manages storage and retrieval of data in the RAM sections of the RAM, the managing comprising executing sets of memory operations, a set of memory operations including:
a read operation during which past values of sensor data signals are read from a section of the RAM and stored in the buffer; and
a write operation during which current values of sensor data signals are written into the section of the RAM read during the read operation, overwriting the past values of sensor data signals stored in the section of the RAM.

10. The system of claim 9, comprising:
an actuator coupled to the plurality of signal processing circuits, wherein the actuator actuates based on the output data signals produced by the plurality of signal processing circuits.

11. The system of claim 10, wherein,
the sensor comprises an automotive kinematic detector, which, in operation, produces sensor data signals as a function of vehicle motion, and
the actuator comprises airbag firing circuitry, which, in operation, produces airbag deployment control signals in response to said output data signals produced by said plurality of signal processing circuits being indicative of an accident.

12. A method, comprising:
receiving sensor data;
generating, using a plurality of signal processing circuits operating in parallel, output data as a function of current and past sensor data values; and
managing storage and retrieval of received sensor data values in a random access memory (RAM) organized into sections, the managing comprising executing sets of memory operations, a set of memory operations including:
  a read operation during which past values of sensor data signals are read from a section of the RAM and stored in a buffer accessible by the plurality of signal processing circuits; and
  a write operation during which current values of sensor data signals are written into the section of the RAM read during the read operation, overwriting the past values of sensor data signals stored in the section of the RAM.

13. The method of claim 12, wherein the managing storage and retrieval of received sensor data includes:
generating address signals to access sections of the RAM; and
in response to a write operation of a set of memory operations, updating address signals to access sections of the RAM.

14. The method of claim 12, wherein the managing storage and retrieval of received sensor data includes:
generating CRC codes for the sensor data signals written into a RAM memory section during a write operation, wherein the generated CRC codes are stored together with respective sensor data signals written into the RAM section; and
performing CRC processing of the sensor data signals read from a RAM section during a read operation.

15. The method of claim 12, comprising:
synchronizing operation of the plurality of signal processing circuits using a common synchronization signal.

16. The method of claim 12, comprising concurrently initializing all the sections in the RAM.

17. The method of claim 12, comprising selectively initializing one or more individual sections of the RAM.

18. The method of claim 12, wherein the generating the output data comprises generating moving window average values of input sensor data signals.

19. A non-transitory computer-readable medium having contents which cause a processing device to perform a method, the method comprising:
receiving sensor data;
generating, using a plurality of signal processing circuits operating in parallel, output data as a function of current and past sensor data values; and
managing storage and retrieval of received sensor data values in a random access memory (RAM) organized into sections, the managing comprising executing sets of memory operations, a set of memory operations including:
  a read operation during which past values of sensor data signals are read from a section of the RAM and stored in a buffer accessible by the plurality of signal processing circuits; and
  a write operation during which current values of sensor data signals are written into the section of the RAM read during the read operation, overwriting the past values of sensor data signals stored in the section of the RAM.

20. The non-transitory computer-readable medium of claim 19, wherein the managing storage and retrieval of received sensor data includes:
generating address signals to access sections of the RAM; and
in response to a write operation of a set of memory operations, updating address signals to access sections of the RAM.

21. The non-transitory computer-readable medium of claim 19, wherein the contents comprise instructions executed by the processing device.

* * * * *